June 13, 1961  R. HANNA  2,987,918
DEW POINT DETERMINING METHOD AND APPARATUS
Filed Oct. 23, 1958  2 Sheets-Sheet 1

INVENTOR.
BY RALPH HANNA
Charles S. Haughey
atty.

INVENTOR.
BY RALPH HANNA

United States Patent Office 2,987,918
Patented June 13, 1961

2,987,918
DEW POINT DETERMINING METHOD
AND APPARATUS
Ralph Hanna, Toledo, Ohio, assignor, by mesne assignments, to Midland-Ross Corporation, Cleveland, Ohio, a corporation of Ohio
Filed Oct. 23, 1958, Ser. No. 769,214
9 Claims. (Cl. 73—336.5)

This invention relates to apparatus and method for determining the absolute humidity of gas and, more particularly, to an improved apparatus and method for determining the absolute humidity of a gas over an extended range of possible humidity values and for determining the absolute humidity of a plurality of gases.

The absolute humidity of a gas, which is commonly defined as the weight of vapor the gas contains per unit weight of dry gas, can be determined by many means. A common method employed is to determine the dew point temperature of the mixture of vapor and dry gas. The gas is usually cooled to the temperature at which vapor begins to deposit upon a polished surface, and the temperature at this point is equal to the dew point temperature. The absolute humidity is thus determined because it is a direct function of dew point temperature.

Other hygrometric methods usually require the measurement of two parameters to determine absolute humidity. The two most common parameters measured are relative humidity, which is the ratio of the quantity of vapor actually present in the gas to the greatest possible at a given temperature, and the temperature (dry bulb) of the gas at the temperature at which the relative humidity is determined.

Relative humidity in turn can be determined by mechanical devices which measure the linear contraction and expansion of a hygroscopic material such as hair, wood, animal membrane, or paper. Chemical devices are also commonly used; these devices utilize a hygroscopic material such as lithium chloride. The hygroscopic material gains or loses moisture until there is an equilibrium established with the partial pressure of the vapor in the gas surrounding the device. The relative humidity can then be determined by weighing the hygroscopic material such as in a hygrometric balance, by determining the electrical conductivity between wires which are wound on a material coated with the hygroscopic material, or by other means.

In many instruments which do not employ the technique of cooling gas to the condensation or dew point temperature, the temperature of the gas is measured or maintained constant at the point at which the relative humidity is determined. It is this latter class of instruments to which the present invention has particular application.

To be in the operable range of a relative humidity detector or sensing element, the gas must be maintained above its dew point temperature, or condensation will occur which will result in an erroneous reading and possible damage of the detector. The gas must also be maintained below some predetermined maximum temperature to be within the operating range; the maximum temperature is dependent upon the characteristics of the particular detector used.

In the preferred form of the invention a commercially available chemical hygrometer is used. The sensing element consists of a metal tube covered with a glass cloth saturated with lithium chloride. A bifilar winding of gold alloy wire is wrapped over the cloth. A constant power supply of a few volts is connected to the winding. The electric conductivity between the wires is directly proportional to the moisture in the salt taken on from the surrounding gas. When the moisture is low, there is a small current flow, and the temperature rise of the element due to Joule heating is low. When the moisture is high, the current flow is high and the temperature rise of the element is high. Thus, a thermometer bulb placed inside the metal tube will measure equilibrium temperature of the element, and, therefore, the absolute humidity or dew point temperature of the gas is determined. It is apparent when utilizing this device, that the gas must be admitted to the element at a temperature below the equilibrium temperature corresponding to highest absolute humidity or dew point to be measured. It is also apparent that the gas cannot be cooled below its dew point without error resulting. Thus, if the gas is admitted to the element at some predetermined temperature, the element will detect absolute humidity or dew point over a given limited range.

It is one of the objects of this invention to increase the range of absolute humidity that may be determined by apparatus of this type. This is accomplished by cooling the gas to a first predetermined temperature before exposing the gas to a first sensing element. This first predetermined temperature will establish a first operable range of absolute humidities that may be determined by the first sensing element. When the dew point or absolute humidity of the gas is below that which can be determined by the first sensing element (i.e. below the first operable range), the gas is cooled to a second predetermined temperature below the first before exposing the gas to a second sensing element. This second predetermined temperature will establish a second operable range of absolute humidities below the first range that may be determined by the second sensing element. Thus, the total range of absolute humidities that can be determined can be greatly extended by cascading two or more ranges which are established by cooling the gas to two or more different predetermined temperatures. The cooling is effected by a single, closed-circuit refrigeration system.

Another object of this invention is to provide apparatus for determining the absolute humidity of a plurality of gases. This can be accomplished by cooling the plurality of gases each to different predetermined temperatures to establish an operable range of absolute humidities that may be determined by a plurality of sensing elements, one for each of the plurality of gases. The cooling is effected by a single closed-circuit refrigeration system.

For further consideration of what I believe to be novel and my invention, attention is directed to the following portion of the specification, the appended claims, and the accompanying drawing.

The illustrated apparatus according to the invention provides means for determining absolute gas humidity. The apparatus employs first and second humidity sensing means which are responsive to gas humidity. Wall means is provided to form a first and second chamber into which the first and second humidity sensing means are respectively placed. Means for delivering gas into contact with the first and second sensing means is connected to the first and second chamber respectively. Refrigeration means is used to maintain the temperature of the gas delivered into contact with the first sensing means relatively higher than the temperature of the gas delivered into contact with the second sensing means. Signal producing means is utilized to produce a signal which is responsive to the first humidity sensing means and which corresponds to the absolute humidity of the gas delivered into contact therewith when the humidity of the gas is relatively high. The signal producing means also produces a signal which is responsive to the second humidity sensing means and which corresponds to the absolute humidity of the gas delivered into contact therewith when the humidity of the gas is relatively lower.

The method of determining absolute gas humidity involves the steps of: compressing a refrigerant in a compressor; expanding refrigerant from the compressor to a first predetermined pressure to absorb heat from sample gas and cool it to a first predetermined temperature; expanding refrigerant from the compressor to a second predetermined pressure which is lower than the first pressure to absorb heat from sample gas and cool it to a second predetermined temperature which is lower than the first temperature; returning refrigerant from the first and second pressures to the compressor; passing gas cooled to the first predetermined temperature into contact with a first humidity sensing element to produce a first signal proportional to the humidity of the gas; converting the first signal to an indication of absolute humidity of the gas passed into contact with the first sensing element; passing gas cooled to the second predetermined temperature into contact with a second humidity sensing element to produce a second signal proportional to the humidity of the gas; and converting the second signal to an indication of absolute humidity of the gas passed into contact with the second sensing element.

Figure 1:
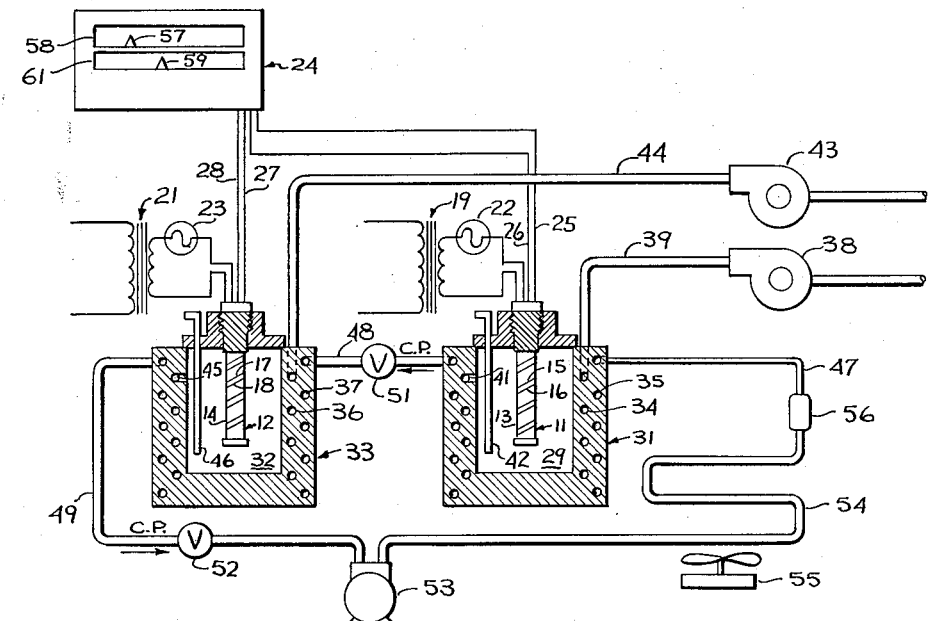
FIG. 1 is a diagrammatic layout of apparatus for determining the absolute humidities of a plurality of gases.

Referring to the drawing, and specifically to FIG. 1, the apparatus shown therein is designed to determine the absolute humidities of a plurality of gases. Although FIG. 1 has been drawn for simplicity to show means for determining the absolute humidities of only two gases, it may readily be appreciated that the apparatus can be constructed to determine the absolute humidities of any number of gases.

Gas humidity is detected by commercially available sensing elements 11 and 12. These elements comprise tubes 13 and 14 over which fiber glass or similar sleeves are placed. The sleeves (not shown) are impregnated with a hygroscopic solution such as lithium chloride. Element 11 is heated by wires 15 and 16, and element 12 is heated by wires 17 and 18. These wires are spirally wound over the sleeves on their respective tubes 13 and 14 in a bifiliar manner. Current is supplied through transformers 19 and 21 and passes between the pair of wires 15 and 16 on element 11 and 17 and 18 on element 12 according to the electrical resistance of the sleeves on tubes 13 and 14 respectively. Ballast lamps 22 and 23 are provided to balance the resistances of elements 11 and 12 respectively which are very low when current is initially applied, the sleeves being saturated with solution at that time.

Within the tubes 13 and 14 are resistance thermometers (not shown). These thermometers measure the temperatures of their respective tubes 13 and 14. The thermometer in tube 13 is connected to recorder 24 by wires 25 and 26, and the thermometer in tube 14 is connected to recorder 24 by wires 27 and 28.

Element 11 is placed in volume 29 formed by the cast aluminum container 31, and element 12 is placed in volume 32 formed by the cast aluminum container 33. Into the walls of container 31 two copper tubes 34 and 35 are integrally cast and are positioned around chamber 29. Similarly copper tubes 36 and 37 are integrally cast into the walls of container 33 and are positioned around the chamber 32. A first sample of gas, the absolute humidity of which is to be determined, is emitted via pump 38 through inlet line 39 to tube 34 which has an outlet 41 into the upper part of volume 29. The gas then passes down over element 11 and exits through outlet line 42 near the bottom of volume 29. Similarly a second sample of gas is emitted via pump 43 through inlet line 44 to tube 36 which has an outlet 45 into the upper part of volume 32. The second gas sample then passes down over element 12 and exits through outlet line 46 near the bottom of volume 32.

Refrigerant is supplied through capillary 47 to tube 35 and exits from tube 35 through line 48. The refrigerant then enters tube 37 and returns through suction line 49. The flow of refrigerant is controlled by constant pressure valve 51 located in line 48 and constant pressure valve 52 located in suction line 49 on the intake side of compressor 53. The compressor runs continuously with this arrangement. The temperature of container 31, and the first sample gas being supplied thereto, is thus controlled by constant pressure valve 51 in line 48.

The temperature of container 33, and the second sample gas being supplied thereto, is controlled by the constant pressure valve 52 in suction line 49. Since the pressure of the refrigerant entering container 33 must be substantially the same as or below the pressure of the refrigerant in chamber 31 due to constant pressure valve 52, the temperature of the second sample gas will be substantially the same as or below the temperature of the first sample gas. After the refrigerant is compressed by compressor 53, it passes through condenser coil 54, over which air is flowed by fan 55, and from there it passes through a combined filter drier 56 to capillary 47.

An alternative, but less desirable equivalent circulation path for the refrigerant, not shown, can be obtained by splitting the flow of refrigerant from the filter-drier 56 into flow through two separate capillaries to coils 35 and 37 in containers 31 and 33 respectively. The outlet lines connected to the two containers would each contain a constant pressure valve, and the lines would both connect to suction line 49.

In operation, first and second sample gases from separate sources are constantly passed through copper tubes 34 and 36 and will be cooled to the refrigerant temperatures in copper coils 35 and 37 respectively. Then the gases are passed through volumes 29 and 32 and come into contact with elements 11 and 12 respectively. The hygroscopic solution on the fiber glass sleeving of each element then either absorbs moisture from or gives up moisture to the gas in contact with it until the vapor pressure of the solution is equal to the vapor pressure of the gas. At this point the solution on each element will be of a certain concentration and will act as an electrolyte to conduct a certain amount of electricity between parallel wires 15 and 16 on element 11 and between parallel wires 17 and 18 on element 12. This will correspondingly heat each element to a certain equilibrium temperature, and this temperature will be sensed by the resistance thermometers in tubes 13 and 14. For a gas with lower absolute humidity or dew point temperature, less moisture will be absorbed by the hygroscopic solution, or more moisture will be given up by it so that the solution will be more concentrated. Less current will then be passed between the wires (15 and 16 or 17 and 18) and the element (11 or 12) will be at a lower temperature. For gases with higher absolute humidities or dew points, the reverse will be true. The temperatures of elements 11 and 12 will thus vary directly with the absolute humidities or dew points of the first and second sample gases respectively and will be at higher temperatures than the dew point temperatures of the respective gases. The resistance thermometer in tube 13 will send a signal to recorder 24 through wires 25 and 26, and this signal will be converted so that the absolute humidity or dew point of the first sample gas will be indicated by pointer 59 on scale 61. The resistance thermometer in tube 14 will likewise send a signal to recorder 24 through wires 27 and 28, and this signal will be converted so that the absolute humidity or dew point of the second sample gas will be indicated by pointer 57 on scale 58.

It is apparent that in this operation the gases emitted to volumes 29 and 32 must be at a temperature below the equilibrium temperatures of the elements 11 and 12 respectively, but above the dew point temperatures of the respective gases to prevent condensation therefrom. Thus if the first sample gas has a dew point temperature of 30° F., which produces a corresponding temperature in sensing element 11 of 92.5° F., the temperature of the first sample gas must be kept within the range above 30° F., and below 92.5° F. In addition, the temperature of the gas should be maintained relatively constant. Slow changes therein will be compensated for, but faster changes will change the temperature of the sensing element and thus give erroneous absolute humidity readings.

By using constant pressure valves 51 and 52 to control refrigerant pressure in containers 31 and 33 respectively, the gas temperatures in the containers can be maintained to better than ±0.5° F., and the compressor is run continuously at light loads. Since the temperature of the sample gas can be maintained within such close limits, practically any type of humidity detector can be used to produce a signal proportional to absolute humidity without the necessity of measuring dry bulb temperature and integrating a relative humidity and dry bulb temperature signal.

Figure 2:
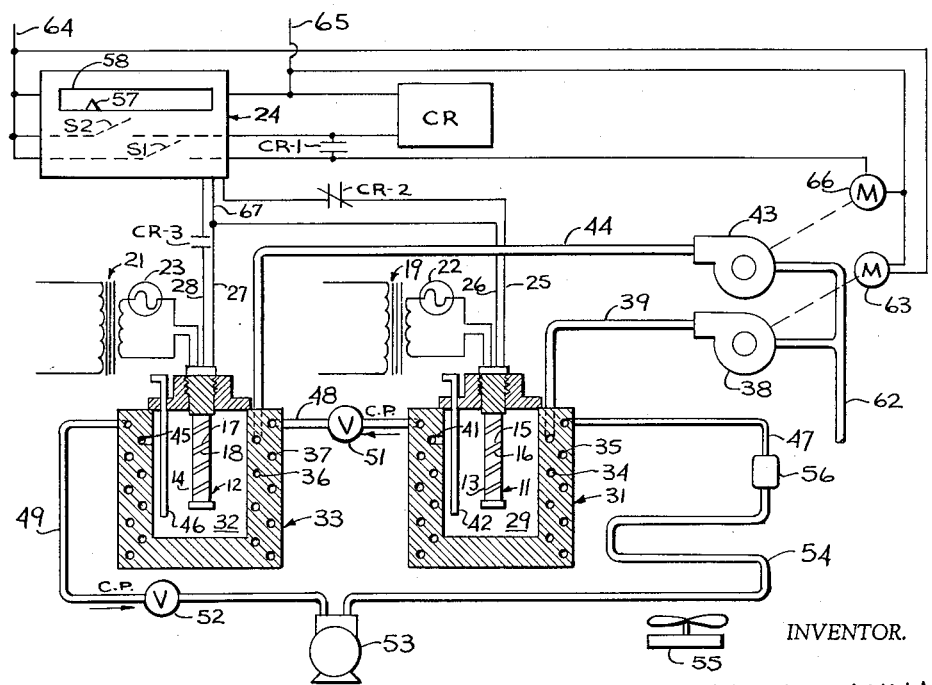
FIG. 2 is a diagrammatic layout of extended range apparatus for determining the absolute humidity of a gas.

Referring to FIG. 2 the apparatus shown therein is designed to determine the absolute humidity of a gas over an extended range of possible humidity values. The apparatus employs first and second humidity sensing means which are responsive to the humidity of a gas. Means is provided for exposing the first sensing means to the gas at relatively high temperature and for exposing the second sensing means to the gas at a relatively lower temperature. Signal producing means is utilized to produce a signal which corresponds to the absolute humidity of the gas and is responsive to the first sensing means when the humidity of the gas is relatively high and is responsive to the second sensing means when the humidity of the gas is relatively low.

The humidity sensing elements, containers therefor and the refrigeration system are the same as those described for FIG. 1. The same numbers denote like parts in all three figures.

Sample gas is supplied to the apparatus of FIG. 2 from a common source 62 to pumps 38 and 43. Motor 63 which runs pump 38 is energized from power wires 64 and 65 at all times; thus, sample gas is supplied continuously to volume 29. Power is also supplied from wires 64 and 65 to recorder 24. Although connection wires have been omitted for clarity, power is supplied from wires 64 and 65 to the primary windings of transformers 19 and 21, compressor 53, and fan 55.

Contact switches S1 and S2 within recorder 24 are utilized to energize control relay CR and motor 66 in a predetermined sequence. When contact switches S1 and S2 are both open, control relay CR is not energized and contacts CR-1, CR-2, and CR-3 will be respectively in their normally open, normally closed, and normally open positions as shown. Sample gas will be supplied to volume 29 because motor 63 is always energized, and sensing element 11 will be connected to recorder 24 through wires 26 and 67 on one side and wire 25 through contact CR-2, which is closed, on the other side. The absolute humidity or dew point of the sample gas in volume 29 will be indicated by pointer 57 on scale 58. Since switch S1 is open, motor 66, which runs pump 43, will not be energized, and sample gas will not be supplied to volume 32. Also sensing element 12 will not be connected to recorder 24 because contact CR-3 in wire 28 is open.

When contact switch S1 is closed, motor 66 will be energized to run pump 43, and sample gas will be supplied to volume 32. However, since control relay CR is not energized the absolute humidity of the sample gas in volume 29 will continue to be indicated by recorder 24.

When contact switch S2 is closed, switch S1 also remaining closed, control relay CR will be energized, and contacts CR-1, CR-2, and CR-3 will be respectively closed, open, and closed. Since motor 66 will still be energized and pump 43 running, sample gas will continue to be supplied to volume 32. Sensing element 12 will be connected to recorder 24 through wire 27 and 67 on one side and wire 28 and contact CR-3, which is closed, on the other side. The absolute humidity of the sample gas in volume 32 will be indicated by recorder 24. Since contact CR-2 is open, sensing element 11 will be disconnected from recorder 24.

When contact switch S2 is opened again, switch S1 remaining closed, control relay CR will remain energized from wire 64 through switch S1 and self-latching contact CR-1. Sensing element 12 will remain connected to recorder 24, and the absolute humidity of the sample gas in volume 32 will continue to be indicated by recorder 24.

When contact switch S1 is opened, switch S2 already being open, control relay CR will be de-energized; neither the circuit from wire 64 through switch S2 to the control relay nor the circuit from wire 64 through switch S1 and self-latching contact CR-1 to the control relay is closed. Contacts CR-1, CR-2, and CR-3 will return to their normal positions of open, closed, and open respectively, as shown. Since motor 66 is no longer energized through switch S1, sample gas will not be supplied to volume 32. Sensing element 11 will again be connected to recorder 24, and the absolute humidity or dew point temperature of the sample gas in volume 29 will be indicated by pointer 57 on scale 58.

It may be desirable, for example, to determine absolute gas humidity over a range of dew point temperatures from 0° F., to 60° F. This range is too wide to be handled by a single sensing element because the equilibrium temperature of the element, which is always higher than the corresponding dew point, would be 47.5° F. for a 0° F. dew point temperature and 133.8° F. for a 60° F. dew point temperature. The dry bulb temperature of the sample gas must be kept above the dew point temperature of the sample gas or condensation will occur. This means the gas must be kept above 60° F. to avoid condensation. However, the gas must also be kept cooler than the equilibrium temperature of the sensing element. This means that the temperature of the gas would have to be kept below 47.5° F. Since the condition of keeping the gas above 60° F. but below 47.5° F. cannot be met, the extended range apparatus of the present invention is employed.

If the sample gas admitted to volume 29 is cooled to 65° F. by proper adjustment of constant pressure valve 51, dew point temperatures in the range from 60° F. to 25° F. may easily be determined therein. Since 60° F. is the highest dew point temperature to be determined in chamber 29, no condensation will take place because the gas is admitted at 65° F. The equilibrium temperature of the sensing element for a dew point of 25° F., is 85.0° F. Since gas dry bulb temperature, 65° F., is below 85.0° F., the sensing element can always reach equilibrium. If the sample gas admitted to volume 32 is cooled to 35° F. by the proper adjustment of constant pressure valve 52, dew point temperatures in the range of 0° F. to 30° F., may easily be determined therein. Since 30° F. is the highest dew point temperature to be determined in chamber 32, no condensation will take place because the gas is admitted at 35° F. The equilibrium temperature of the sensing element for a dew point temperature of 0° F. is 47.5° F. Since the gas dry bulb temperature, 35° F., is below 47.5° F., the element can always reach equilibrium. By proper switching between sensing elements 11 and 12, dew points or absolute humidities can be determined for the entire dew point temperature range of 0° F. to 60° F.

In operation, for the example above, constant pressure valve 51 would be set to maintain a refrigerant temperature in copper coil 35 of 60° F., and constant pressure valve 52 would be set to maintain a refrigerant temperature in copper coil 37 of 35° F. Since motor 63 is always energized, sample gas will be supplied continuously to volume 29 via pump 38, inlet line 39, copper coil 34 and outlet 41. This gas will be cooled to the refrigerant temperature of 65° F. by heat transfer between coils 34 and 35. When motor 66 is energized, sample gas will be supplied to volume 32 via pump 43, inlet line 44, copper coil 36 and outlet 45. This gas will be cooled to the refrigerant temperature of 35° F. by heat transfer between coils 36 and 37.

In recorder 24 contact switch S1 is set to close at 30° F. and contact switch S2 is set to close at 25° F. Above 30° F. switches S1 and S2 are both open, and control relay CR will not be energized. Pump 38 supplies sample gas to chamber 29 and humidity sensing element 11 will be connected to recorder 24 by wires 26 and 67 on one side and by wire 25 through contact CR–2, which is in its normally closed position, on the other side. The absolute humidity or dew point temperature of the sample gas in volume 29 will be indicated by pointer 57 on scale 58 for the dew point temperature range from 60° F. down to 25° F.

When the dew point temperature of the sample gas decreases to 30° F. contact switch S1 will close and motor 66 will be energized to run pump 43 and supply sample gas to volume 32. Since control relay CR is not energized, sensing element 11 will remain connected to recorder 24.

When the dew point temperature of the sample gas decreases to 25° F., contact switch S2 will close, and control relay CR will be energized. Sensing element 11 will be disconnected from recorder 24 because contact CR–2 will be open, and sensing element 12 will be connected to recorder 24 because contact CR–3 will be closed. The absolute humidity or dew point temperature of the sample gas in volume 32 will be indicated by recorder 24 from 25° F., down to 0° F. Although element 12 is sensing the humidity of sample gas supplied to volume 32 in this range, pump 38 continuously supplies sample gas to volume 29. This is done so that sensing element 11 will be in equilibrium with the sample gas when the transfer is made back to it. Also since the temperature of the sample gas in contact with sensing element 11 is always 65° F., there is no danger of condensation in chamber 29 with consequent damage to sensing element 11.

When the dew point temperature of the sample gas increases from below 25° F., to 25° F. contact switch S2 will open but control relay CR will remain energized from wire 64 through switch S1 and self-latching contact CR–1. Sensing element 12 will remain connected to recorder 24.

When the dew point temperature of the sample gas increases to 30° F., contact switch S1 will open, and control relay CR will be de-energized. Sensing element 12 will be disconnected from recorder 24 because contact CR–3 will be open, and sensing element 11 will again be connected to recorder 24 because contact CR–2 will be closed, and the absolute humidity or dew point temperature of sample gas in volume 29 will be indicated by recorder 24. Since motor 66 is no longer energized through switch S1, sample gas will not be supplied to volume 32; hence, there will be no condensation on sensing element 12 when the dew point temperature of the sample gas rises above the refrigerant temperature of 35° F.

It will be noted that there is a 5° F. temperature difference in the transfer point of the sensing elements when decreasing the dew point temperature of the sample gas to a lower dew point temperature than when increasing the dew point temperature of the sample gas to a higher dew point temperature. This is an expedient to prevent frequent switching from one sensing element to the other when there is a slight change in dew point temperature of the sample gas. Also when the dew point of the sample gas is decreasing, sample gas is admitted to volume 32 when the dew point temperature reaches 30° F., but sensing element 12 is not connected to the recorder until the dew point temperature reaches 25° F. This allows the sensing element purging time to reach an equilibrium with the sample gas before it becomes the signaling element.

Figure 3:
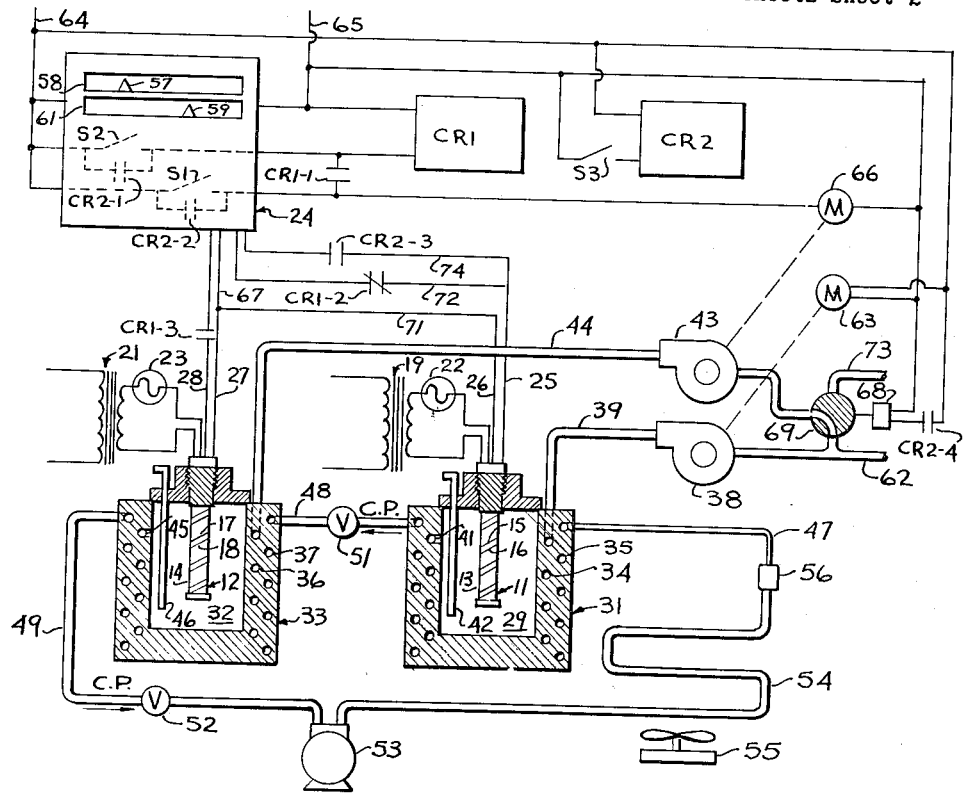
FIG. 3 is a diagrammatic layout of apparatus combining the features of FIG. 1 and FIG. 2.

Referring to FIG. 3, the apparatus shown therein is designed to determine the absolute humidity of a gas over an extended range of possible humidity values or to be alternately used to determine the absolute humidities of a plurality of gases. The apparatus employs first and second humidity sensing means which are responsive to gas humidity. Means is provided for delivering a first gas into contact with the first and second sensing means, or a first and second gas into contact with the first and second sensing means, respectively. Refrigeration means maintains the temperature of gas delivered into contact with the first sensing means relatively higher than the temperature of gas delivered into contact with the second sensing means. First signal producing means is utilized to produce a first signal which corresponds to the absolute humidity of the first gas and is responsive to the first sensing means when the humidity of the first gas is relatively high and is responsive to the second sensing means when the first gas is delivered thereto and its humidity is relatively lower. Second signal producing means is utilized to produce a second signal which is responsive to the second sensing means and corresponds to the absolute humidity of the second gas when it is delivered into contact therewith.

The apparatus of FIG. 3 is a combination of the apparatuses of FIG. 1 and FIG 2. It can be used to perform the function of the apparatus of FIG. 1 to determine the absolute humidities of a plurality of gases. By merely closing a switch, it can be used to perform the function of the apparatus of FIG. 2 to determine the absolute humidity of a gas over an extended range of possible humidity values.

All the parts common to FIG. 1 and FIG. 2 operate in the same manner as previously described with like parts bearing the same numbers in all three figures.

When switch S3 is open, control relay CR2 is not energized, and the apparatus performs the function of the apparatus of FIG. 2 to determine the absolute humidity of a gas over an extended range. All the contacts of relay CR2, contacts CR2–1, CR2–2, CR2–3, and CR2–4, are in their normally open position, as shown. The solenoid operator 68 of three-way valve 69 is not energized because contact CR2–4 is open. Valve 69 will, therefore, be in its normal position, as shown, and sample gas will be supplied from common source 62 to pumps 38 and 43. When the humidity of the sample gas is being determined in volume 29, sensing element 11 will be connected to recorder 24 through wires 26, 71, and 67 on one side, and wires 25 and 72 through contact CR1–2, which will be closed, on the other side. When the humidity of the sample gas is being determined in volume 32, sensing element 12 will be connected to recorder 24 through wires 27 and 67 on one side and wire 28 through contact CR1–3, which will be closed, on the other side. The absolute humidity or dew point of the sample gas will be indicated by pointer 57 on scale 58.

When switch S3 is closed, control relay CR2 is energized, and the apparatus performs the function of the apparatus of FIG. 1 to determine the absolute humidities of a plurality of sample gases. All the contacts of relay CR2, contacts CR2–1, CR2–2, CR2–3, and CR2–4, will be in their closed position. Contact switches S1 and S2 will be shorted by closed contacts CR2–1 and CR2–2 respectively. This will energize control relay CR1 so that contacts CR1–1, CR1–2, and CR1–3 will be respectively closed, open, and closed. Since switch S1 will be shorted by contact CR2–2, motor 66 will operate continuously. Contact CR2–4 being closed, solenoid operator 68 will be energized, and three way valve 69 will be moved to the position wherein a first sample gas will be supplied from source 62 through pump 38, inlet line 39, copper tube 34 and outlet 41 to volume 29, and a second sample gas will be supplied from independent source 73 through pump 43, inlet line 44, copper tube 36 and outlet 45 to volume 32. The humidity of the first sample gas in volume 29 will be continuously detected by sensing element 11 which will be connected to recorder 24 by wires 26, 71 and 67 on one side and by wires 25 and 74 through contact CR2-3, which is closed, on the other side. The absolute humidity or the dew point temperature of the first sample gas will be indicated by pointer 59 on scale 61. The humidity of the second sample gas in volume 32 will be continuously detected by sensing element 12 which will be connected to recorder 24 by wires 27 and 67 on one side and wire 28 through contact CR1-3, which will be closed, on the other side. The absolute humidity or the dew point temperature of the second sample gas will be indicated by pointer 57 on scale 58.

A common variation, not shown, that can be made to the apparatus of FIG. 2 and FIG. 3 is to run motor 66 continuously so that pump 43 is continuously supplying sample gas to inlet line 44. A three-way solenoid operated valve would be incorporated in inlet line 44 adjacent container 33 so that when sample gas is not being supplied to volume 32 for measurement, the sample gas in line 44 would be bled to atmosphere. This valve would be operated by contact switch S1 in the same manner as motor 66 is operated in the illustrations of FIG. 2 and FIG. 3. This would be a particularly advantageous means of operating when sample line 44 is unusually long because line 44 would be continuously purged, and there would be no time lag when transferring from sensing element 11 to sensing element 12.

Various modifications can be made in the apparatus illustrated and described without departing from the spirit of the claims, as the embodiments of the invention shown and described are intended as illustrative only.

I claim:

1. Apparatus for determining absolute gas humidity comprising: first and second humidity sensing means responsive to gas humidity; wall means forming first and second chambers for said first and second humidity sensing means, respectively; means for delivering gas into contact with the sensing means in said first and second chambers; refrigeration means for maintaining the temperature of the gas delivered into contact with the first sensing means relatively higher than the temperature of the gas delivered into contact with the second sensing means; and signal producing means for producing a signal responsive to the first humidity sensing means, corresponding to the absolute humidity of the gas delivered into contact therewith when said humidity is relatively high, and for producing a signal, responsive to the second humidity sensing means corresponding to the absolute humidity of the gas delivered into contact therewith when the humidity of said gas is relatively lower.

2. Apparatus according to claim 1 wherein said refrigeration means comprises compressor means and first and second expansion means, pressure controlling means for maintaining the pressure in the second expansion means relatively lower than the pressure in the first expansion means; and wherein said first expansion means is adapted to cool gas delivered to the first sensing means and said second expansion means is adapted to cool gas delivered to said second sensing means.

3. Apparatus for determining the absolute humidity of a plurality of gases comprising: first and second humidity sensing means responsive to gas humidity; wall means forming first and second chambers for said first and second humidity sensing means, respectively; means for delivering a first and second gas into contact with the sensing means in said first and second chambers, respectively; refrigeration means for maintaining the temperature of the first gas delivered into contact with the first sensing means relatively higher than the temperature of the second gas delivered into contact with the second sensing means; means for producing a first signal, responsive to the first humidity sensing means, corresponding to the absolute humidity of the first gas delivered into contact therewith; and means for producing a second signal responsive to the second humidity sensing means, corresponding to the absolute humidity of the second gas delivered into contact therewith.

4. Apparatus for determining absolute gas humidity comprising: first and second humidity sensing means responsive to gas humidity; wall means forming first and second chambers for said first and second humidity sensing means; means for delivering a first gas into contact with the sensing means in said first chamber; means for alternately delivering the first gas or a second gas into contact with the sensing means in said second chamber; refrigeration means for maintaining the temperature of gas delivered into contact with the first sensing means relatively higher than the temperature of gas delivered into contact with the second sensing means; means for producing a first signal, corresponding to the absolute humidity of the first gas, responsive to the first sensing means when said humidity is relatively high and responsive to the second sensing means when said first gas is delivered thereto and its humidity is relatively lower; and means for producing a second signal, responsive to the second sensing means, corresponding to the absolute humidity of the second gas when it is delivered into contact therewith.

5. In apparatus for determining the dew point temperatures of vapors in a plurality of gases comprising in combination: first and second devices each being responsive to the humidity of a gas delivered into contact therewith, said devices being operable over given ambient temperature ranges above the dew point temperature ranges of vapor in the gas to be measured; first and second containers into which said first and second devices are respectively placed; inlet and outlet means for said first container for passing therethrough a first gas sample; refrigerant; means for introducing said refrigerant to said first container in heat transfer relationship to the first gas sample; means for maintaining the temperature of said refrigerant above the normal range of dew point temperatures of vapor in the first gas sample while passing through said first container; second inlet and outlet means for said second container for passing therethrough a second gas sample; means for introducing said refrigerant to said second container in heat transfer relationship to the second gas sample; and means for maintaining the temperature of said refrigerant above the dew point temperature of vapor in the second gas sample while passing through said second container.

6. In apparatus for determining the dew point temperatures of vapors in a plurality of gases comprising in combination: first and second dew point determining devices each being responsive to the absolute humidity of a gas delivered into contact therewith, said devices being operable over a given ambient temperature range above the dew point temperature of vapor in the gas to be measured; first and second containers into which said first and second devices are respectively placed; inlet and outlet means for said first and second containers for passing therethrough a first and second gas sample respectively, a closed refrigeration circuit having a refrigerant contained therein, circulation through said first and second containers in heat transfer relationship to the first and second gas samples respectively being part of said circuit; means for maintaining the temperature of the refrigerant in the portion of the circuit passing through said first container between the dew point temperature of vapor in the first gas sample and a predetermined higher temperature, and means for maintaining the temperature of the refrigerant in the portion of the circuit passing through said second container between the dew point temperature of the vapor in the second gas sample and a predetermined higher temperature.

7. Extended range dew point determining apparatus comprising, in combination: first and second devices responsive to the humidity of a gas delivered into contact therewith, said devices being operable over a given ambient temperature range above the dew point temperature of vapor in the gas; first and second containers into which said first and second devices are respectively placed; inlet and outlet means for said first container for passing a gas sample therethrough; refrigerant; means for introducing said refrigerant to said first container in heat transfer relationship to said sample therein; means for maintaining the temperature of said refrigerant while passing through said first chamber above the normal dew point temperature of vapors in said gas sample to define a first operable ambient temperature range for said first device; second inlet and outlet means for said second container for passing a gas sample therethrough; means for introducing said refrigerant to said second container in heat transfer relationship to said sample therein; means for maintaining the temperature of said refrigerant while passing through said second container a predetermined amount lower than the temperature of the refrigerant while passing through the first chamber to thereby define a second operable ambient temperature range for said second device; and means for automatically admitting the gas sample to said first container when the dew point temperature of the vapors in the sample is within the first operable ambient temperature range and for admitting the gas sample to said second container when the dew point temperature of the vapors in the sample is within the second operable ambient temperature range.

8. Apparatus for determining absolute gas humidity comprising: a pair of humidity sensing means responsive to gas humidity; wall means forming a pair of chambers, one for each of said pair of humidity sensing elements; first duct means for delivery of a first gas into contact with one of the pair of said sensing means in one of the pair of said chambers; second duct means for delivery of the first gas or a second gas into contact with the other of the pair of said sensing means in the other of the pair of said chambers; refrigeration means for maintaining the temperature of the gas delivered through the first duct means relatively higher than the temperature of the gas delivered through the second duct means; means for producing a first signal corresponding to the absolute humidity of the first gas, responsive to the one of the pair of said sensing means to which the first gas is delivered through the first duct means when its humidity is relatively high and responsive to the other of the pair of said sensing means when said first gas is delivered thereto through the second duct means and its humidity is relatively lower; and means for producing a second signal, responsive to the other of the pair of said sensing means, corresponding to the absolute humidity of the second gas when delivered into contact therewith through the second duct means.

9. Apparatus for determining the absolute humidity of a gas comprising: first and second humidity sensing means responsive to the humidity of a gas; wall means forming first and second chambers for said first and second humidity sensing means; means for delivering the gas into contact with the sensing means in said first and second chambers; refrigeration means for maintaining the temperature of the gas delivered into contact with first sensing means relatively higher than the temperature of the gas delivered into contact with the second sensing means; and means producing a signal corresponding to the absolute humidity of the gas, selectively responsive to the first sensing means when said humidity is relatively high and responsive to the second sensing means when said humidity is relatively low.

References Cited in the file of this patent
UNITED STATES PATENTS

| | | |
|---|---|---|
| 2,637,199 | Allander | May 5, 1953 |
| 2,819,614 | Sion | Jan. 14, 1958 |
| 2,897,673 | Wylie | Aug. 4, 1959 |